(12) United States Patent
Levin et al.

(10) Patent No.: US 10,484,348 B1
(45) Date of Patent: Nov. 19, 2019

(54) NETWORK DEVICE WITH VIRTUAL PRIVATE FILE SYSTEM

(71) Applicant: AMAZON TECHNOLOGIES, INC., Seattle, WA (US)

(72) Inventors: Alex Levin, Cupertino, CA (US); Ron Diamant, Albany, CA (US); Ihab Bishara, Mountain View, CA (US); Michael Butler Fortin, Hollis, NH (US); Gary Lee Szilagyi, Monte Sereno, CA (US); Georgy Machulsky, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 164 days.

(21) Appl. No.: 15/388,548

(22) Filed: Dec. 22, 2016

(51) Int. Cl.
| | |
|---|---|
| *H04L 29/00* | (2006.01) |
| *H04L 29/06* | (2006.01) |
| *H04L 29/08* | (2006.01) |
| *H04L 9/08* | (2006.01) |
| *H04L 9/06* | (2006.01) |
| *H04L 9/32* | (2006.01) |
| *G06F 16/14* | (2019.01) |
| *G06F 16/182* | (2019.01) |

(52) U.S. Cl.
CPC ........ *H04L 63/0471* (2013.01); *G06F 16/156* (2019.01); *G06F 16/182* (2019.01); *H04L 9/0618* (2013.01); *H04L 9/0877* (2013.01); *H04L 9/3226* (2013.01); *H04L 9/3239* (2013.01); *H04L 67/1097* (2013.01)

(58) Field of Classification Search
CPC ..... H04L 63/00; H04L 63/0428; H04L 63/10; H04L 67/1097; H04L 63/04
See application file for complete search history.

(56) References Cited

U.S. PATENT DOCUMENTS

| | | | |
|---|---|---|---|
| 2008/0034222 A1* | 2/2008 | Torisaki .................. | G06F 21/10 713/193 |
| 2014/0331062 A1* | 11/2014 | Tewari ................ | G06F 21/6227 713/189 |
| 2016/0056961 A1* | 2/2016 | Gueron ................. | H04L 9/3226 |
| 2017/0076105 A1* | 3/2017 | Paulovicks .......... | G06F 21/6218 |

* cited by examiner

*Primary Examiner* — Ghazal B Shehni
(74) *Attorney, Agent, or Firm* — Blank Rome LLP

(57) ABSTRACT

A network device includes a processor coupled to network interface circuitry and cryptographic circuitry. The network interface circuitry is configured to couple the network device to a local computer communication network. The processor is configured to generate an encryption key based on a hardware specific value recorded in the network device, and apply the cryptographic circuitry and the encryption key to encrypt files for storage in an Internet storage system coupled to a remote computer communication network, and present the encrypted files stored, by the processor, in the Internet storage system, to a computing device coupled to the network device via the local computer communication network, as a storage system attached to the local computer communication network.

20 Claims, 8 Drawing Sheets

US 10,484,348 B1

NETWORK DEVICE WITH VIRTUAL PRIVATE FILE SYSTEM

BACKGROUND

As the quantity of information produced increases, the data storage resources available to store the information must also increase. Accordingly, conventional storage devices, such as semiconductor memories, magnetic, and optical storage devices have continued to increase in capacity. New storage paradigms have also arisen to accommodate the need for increased storage capacity. For example, Internet-based storage services (also called cloud storage systems or Internet storage systems) allow a user to store information, such as computer files, in a remote location via the Internet. The storage devices of an Internet-based storage service may be geographically distant from the user's computing system, and communicate with the user's computing system via a variety of different network types including local area networks and wide area networks in addition to the Internet. An Internet-based storage service may be managed by the user himself, an entity associated with the user, such as an information technology group of a corporation associated with the user, or a third party that offers the storage service commercially, for private or public use.

BRIEF DESCRIPTION OF THE DRAWINGS

For a detailed description of various examples, reference will now be made to the accompanying drawings in which.

DETAILED DESCRIPTION

As the quantity of data being stored increases, and the storage locations become more diverse, maintaining privacy of stored data becomes increasingly important. The present disclosure is directed to technologies for securing stored data by providing a virtual private file system. In embodiments disclosed herein a network device connected to a local area network manages a virtual private file system using storage provided by an Internet storage provider (i.e., cloud storage). Computing devices connected to the local area network access the virtual private file system via the network device. To the computing devices on the local area network, the virtual private file system appears to be located on the local area network. The network device presents the virtual private file system to the devices on the local area network in a same or similar manner as a file system that uses storage located on the local area network. The virtual private file system encrypts at least some of the files prior to storage. Some files may be stored as plaintext. Files may be stored locally or in an Internet storage system. Private files sent from the local area network to the Internet storage system are encrypted prior to transmission to the Internet storage system. Accordingly, private files resident in the Internet storage system are always encrypted. On request to access an encrypted file stored in the Internet storage system, the network device retrieves the encrypted file from the Internet storage system, decrypts the encrypted file, and provides the plaintext file to the requesting computing device via the local area network. In some embodiments, the network device does not retain or cache a copy of a plaintext file that is stored as an encrypted file.

Various types of network devices may include logic and circuitry to manage the virtual private file system. For example, a wireless network access point, a network bridge, a network switch, a router, or other device that directs traffic on a network may include logic and circuitry to manage the virtual private file system. In some embodiments, a network attached storage device, a media server, or a set top box connected to a network may include logic and circuitry to manage the virtual private file system.

Figure 1:
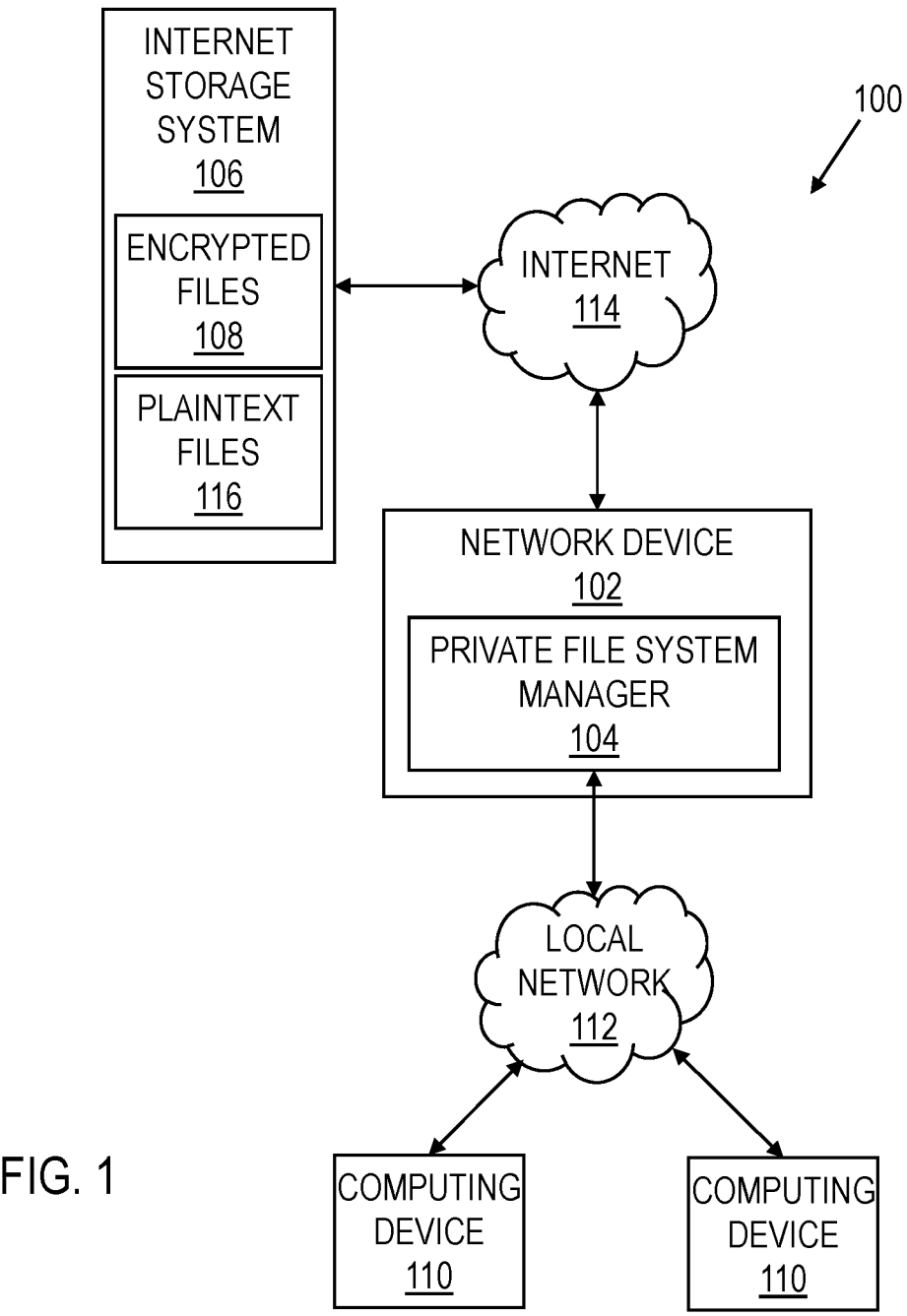
FIG. 1 shows block diagram for a system for providing a virtual private file system in accordance with various embodiments.

FIG. 1 shows block diagram for a system 100 for providing a virtual private file system in accordance with various embodiments. The system 100 includes a network device 102. The network device is coupled to a local network 112 and to the Internet 114. One or more computing devices 110 are coupled to the local network 112. The computing devices 110 communicate with the network device 102 via the local network. The local network may include a wireless local area network and/or a wired local area network. For example, the local area network may include a wireless local area network compliant with an IEEE 802.11 standard, and/or a wired local area network compliant with an IEEE 802.3 standard, and/or a different type of wired or wireless network whether proprietary or standard compliant.

The computing device 110 may be any device that is capable of communicating with the network device 102 via the local network 112. For example, the computing device may be a desktop computer, a laptop computer, a tablet computer, a smartphone, a media player, or any other computer-based device that can communicate with the network device 102 via the local network 112.

The network device 102 may provide any of a variety of functionalities to be utilized by the computing devices 110. For example, the network device 102 may include circuitry and logic that allows the computing devices 110 on the local network 112 to access the Internet 114 or to connect to the local network 112. For example, the network device 102 may operate as an access point to the local network 112, where the local network 112 is a wireless network, or may operate as a network switch, where the local network 112 is a wired network. The network device 102 may be connected to the Internet 114 via any suitable Internet interface mechanism. For example, the network device 102 may include, or be connected to a cable modem, a satellite data interface, a digital subscriber line interface, a power line network interface, a terrestrial broadband wireless network interface, an optical fiber network interface, or an interface to another network that provides access to the Internet 114. In the system 100, the network device 102 may provide access to the Internet 114 via any of a wide variety of Internet connection technologies internal or external to the network device 102. For example, the network device 102 may include an IEEE 802.3 compliant interface and be coupled to an external cable modem via the IEEE 802.3 compliant interface. In some embodiments, the network device 102 may include a cable modem or other Internet connection interface circuitry.

The network device 102 includes a private file system manager 104. The private file system manager 104 creates and manages a file system that is accessible to the computing devices 110 connected to the local network 112. Some embodiments of the network device 102 may provide storage for at least some of the files managed by the private file system manager 104. In the embodiment of the network device 102 shown in FIG. 1, the private file system manager 104 utilizes an Internet storage service to provide storage for the files managed by the private file system manager 104. Accordingly, the private file system manager 104 is coupled to an Internet storage system 106 (a cloud storage system) via the Internet 114. The Internet storage system 106 provides storage for the files managed by the private file system manager 104. The Internet storage system 106 may be distant from the network device 102 and store data received from any number of different entities. That is, the Internet storage system 106 may be managed by a service provider that offers storage services for public or private use. The structure of the storage applied by the Internet storage system 106 to store files may be obscured from the network device 102.

At least some of the files managed by the private file system manager 104 are private and secured by encryption. Accordingly, some files stored in the Internet storage system 106 are transmitted to the Internet storage system 106 and stored as encrypted files 108. Thus, the private files managed by the private file system manager 104 are present on the Internet 114 and the Internet storage system 106 only in encrypted form. Plaintext versions of the private files managed by the private file system manager 104 are not transmitted via the Internet 114 or stored in the Internet storage system 106. However, the files managed by the private file system manager 104 appear to the computing devices 110 connected to the local network 112 as though stored on the local network 112, e.g., by the network device 102 in plaintext form. In some embodiments, the private file system manager 104 may employ features of the Internet storage system 106 that conceal the encrypted files 108 from other users of the Internet storage system 106. That is, the existence of the encrypted files 108 may be detectable only by the network device 102. Files managed by the virtual private file system manager 104 that are not deemed private may be stored in the Internet storage system 106 without encryption as plaintext files 116.

When a computing device 110 transmits a plaintext file to the network device 102 for storage as a private file, the network device 102 encrypts the file, and transmits the encrypted file to the Internet storage system 106 for storage. The network device 102 may delete or erase the plaintext file from the network device 102. That is, after the network device 102 encrypts the plaintext file received from the computing device 110, the network device 102 may ensure that the plaintext file is not stored in the network device 102. The network device 102 may store metadata for the file. For example, the network device 102 may store a list of the files (e.g., file names, sizes, etc.) for presentation to the computing devices 110 as the private file system maintained by the private file system manager 104.

When a computing device 110 requests access to a plaintext file that the private file system manager 104 has stored as an encrypted file 108, the private file system manager 104 communicates with the Internet storage system 106 and retrieves the encrypted file 108 corresponding to the requested plaintext file from the Internet storage system 106. The private file system manager 104 decrypts the encrypted file 108 retrieved from the Internet storage system 106 to produce the requested plaintext file, and transmits the plaintext file to the computing device 110 that requested access to the file.

The private file system manager 104 may apply any of a variety of encryption algorithms to secure the files stored in the Internet storage system 106. For example, the private file system manager 104 may apply AES-256 or any other suitable encryption technique to encrypt the files stored in the Internet storage system 106. The private file system manager 104 may generate an encryption key to apply to encrypt the plaintext files received from the computing devices 110 and/or to decrypt the encrypted files 108 retrieved from the Internet storage system 106. The private file system manager 104 may generate the encryption key as a combination of data unique to the network device 102 and security information received from one of the computing devices 110 or a user of the network device 102. For example, the network device 102 may receive a password (e.g., a file system password) from one of the computing devices 110 (e.g., a user of one of the computing devices 110 may provide security information such as a password). The private file system manager 104 may combine the password with a data value unique to the network device 102 to produce an encryption key. (The data value may be "unique" in the sense that it is contained in only one instance of the network device 102; or, it may be "unique" in the sense that although some instances of the device 102 share a given the data value, other instances have other data values.) The data value unique to the network device 102 may be unique across multiple instances of the network device 102 or unique to a particular type, model, or instance of the network device 102. In embodiments of the network device 102 in which the data value unique to the network device 102 is unique to a particular type or model of the network device 102, embodiments advantageously allow the encryption key to be recreated using a different instance of the network device 102 in situations where access to the file system is to be provided from multiple locations, or an instance of the network device used to generate the encrypted files 108 fails or is otherwise unavailable. For example, a new network device of the same type, model, version, etc. as the network device 102 may be procured. The new network device contains the same unique data value as the network device 102. Accordingly, after receipt of a password or other security information from a user of the new network device, the new network device can apply the user provided security information and the unique data value to recreate the encryption key used by the network device 102 to secure the files 108. The new network device may apply the same processing as the network device 102 to generate the encryption key. Thus, the new network device can recreate and apply the encryption key to access the encrypted files 108 stored in the Internet storage system 106.

In some embodiments, the private file system manager 104 combines the password and the data value unique to the network device 102 by applying a hash to the concatenated password and data value unique to the network device 102.

Some embodiments of the private file system manager 104 may generate an encryption key by combining the password and the data value unique to the network device 102 in a different manner. By generating the encryption key based on a combination of data unique to the network device 102 and a password provided by user, the private file system manager 104 can maintain security of the encrypted files even if the password is compromised. Because the encryption key is strongly tied to the hardware of the network device 102, the encrypted files 108 can be decrypted only with access to the network device 102.

In embodiments of the network device 102 in which the data value unique to the network device 102 is unique across all network devices 102 or is not common across a particular type or model of the network device 102, the manufacturer of the network device 102 may modify an existing network device 102 or produce a new network device 102 to include the unique data value of a first network device 102 in the new or modified network 102. Thereafter, the new or modified network device 102 may be used to access encrypted files 108 stored in the Internet storage system 106 by the first network device 102. For example, a registered owner of a network device 102 may contact the manufacturer of the network device 102 and provide identity authentication information for the owner and the network device 102. The manufacturer of the network device 102 may retrieve the unique data value of the network device 102 from a secure database and manufacture a new network device 102 using the retrieved unique data value, or modify an existing network device 102 to include the retrieved unique data value, and provide the new/modified network device 102 to the owner. In some embodiments, the unique data value may be stored in network device 102 via immutable storage, such as fusible links. Some embodiments, may store the unique data value in a different type of non-volatile storage. The new/modified network device 102 may apply the unique data value, in conjunction with a user provided password to generate the encryption key used to encrypt the files 108, and apply the encryption key to access the encrypted files 108.

Some embodiments of the network device 102 may be modifiable after delivery to a user (e.g., at the user's site). For example, an owner of a first network device 102 may desire to access encrypted files 108 from a different geographical location than that of the first network device 102. A second network device 102 may be procured. However, because the second network device 102 lacks the unique data value used to encrypt the files 108, the second network device 102 will be unable to access the encrypted files 108. The owner of the first and second network devices 102 may contact the manufacture of the network devices 102 and provide authentication information for the owner, the first network device 102, and the second network device 102. For example, the owner may access a web portal of the manufacturer to provide the authentication information. The manufacturer may use the authentication information to retrieve the unique data value of the first network device 102 from a secure database. The owner and/or the manufacturer may establish a secure communication link between the second network device 102 and the manufacturer that allows the manufacturer to download the unique data value to the second network device 102. Thereafter, the second network device 102 may apply the unique data value, in conjunction with a user provided password to generate the encryption key used by the first network device 102, and apply the encryption key to access the encrypted files 108.

Figure 2:
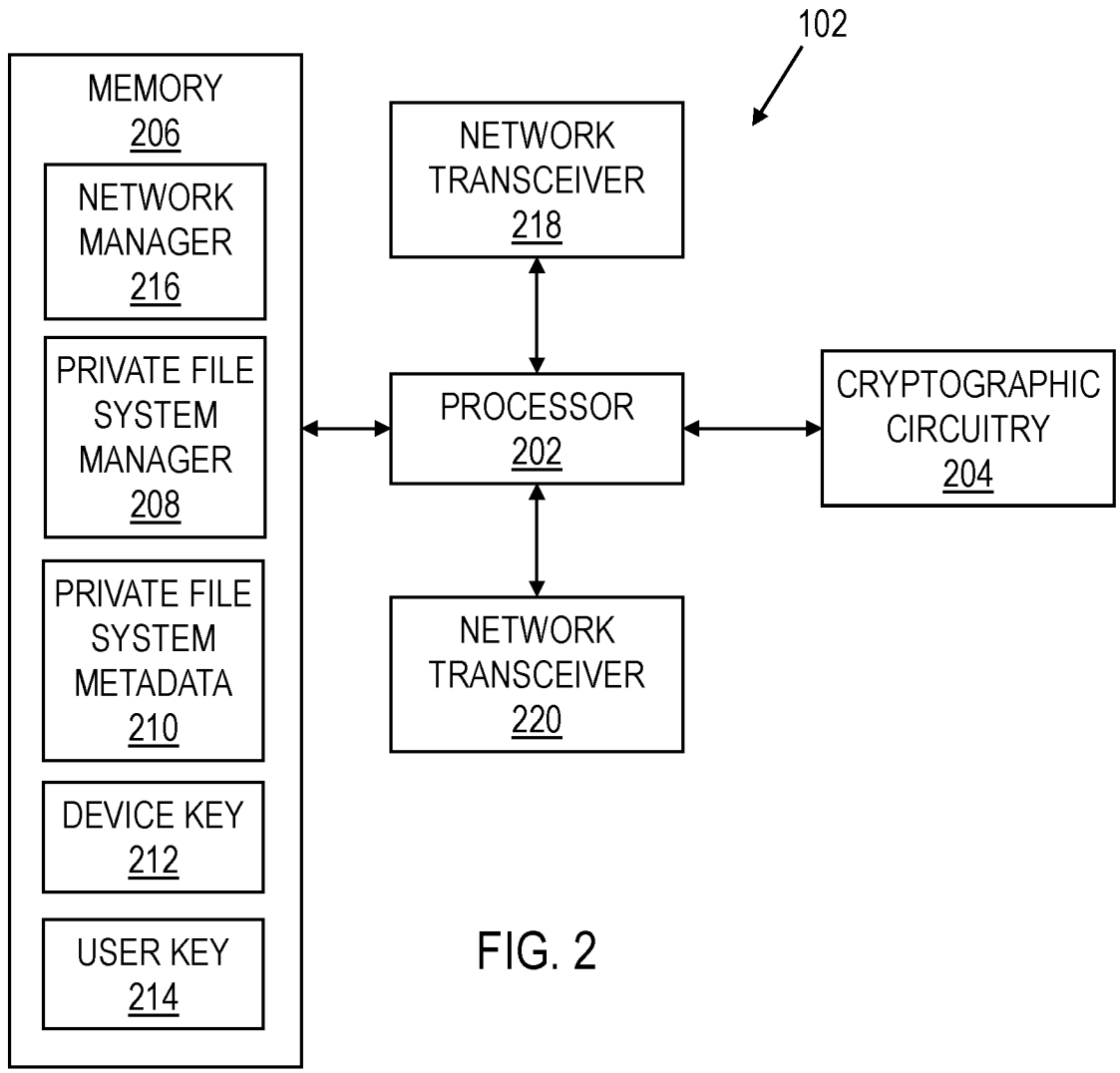
FIG. 2 shows a block diagram for a network device for providing a virtual private file system in accordance with various embodiments.

FIG. 2 shows a block diagram for the network device 102 in accordance with various embodiments. The network device 102 includes a processor 202, cryptographic circuitry 204, a first network transceiver 218, a second network transceiver 220, and memory 206. Some embodiments of the network device 102 may include more than two transceivers. The processor 202 is an instruction execution circuit, and in various embodiments, may include one or more general-purpose or embedded microprocessors, micro-controllers, network processors, digital signal processors, and/or other instruction execution machines. The processor 202 is coupled to the cryptographic circuitry 204, the first network transceiver 218, the second network transceiver 220, and the memory 206. The functions of the cryptographic circuitry 204 can also be implemented by a cryptographic unit that is a combination of hardware and software.

The first network transceiver 218 may include circuitry to interface the network device to the local network 112. For example, the first network transceiver may include circuitry to interface to one or more antennas of the network device 102 if the local network 112 is a wireless network. Similarly, the first network transceiver may include line driver and line receiver circuitry if the local network is a wired network. The first network transceiver may also include a modulator, a demodulator, an encoder, a decoder, amplifiers, filters, and/or other components. For example, the first network transceiver 218 may implement an IEEE 802.11 compliant network interface or an IEEE 802.3 compliant network interface.

The second network transceiver 220 may include circuitry to interface the network device to the Internet 114. For example, the second network transceiver 202 may include circuitry to provide an 802.3 compatible interface to couple the network device 102 to a cable modem or other device that couples the network device 102 to the Internet 114. In some embodiments, the second network transceiver 220 may include a cable modem or other device to couple the network device 102 to the Internet 114. The second network transceiver 220 includes various circuits to provide the functionality of the transceiver. For example, the second network transceiver 220 may include a line driver, a line receiver, amplifiers, filters, a decoder, an encoder, a modulator, a demodulator, and/or other circuits.

The cryptographic circuitry 204 includes circuits and/or logic to encrypt plaintext files, i.e., generate an encrypted file from a plaintext file, and to decrypt encrypted files, i.e., recreate the plaintext file from which the encrypted file was generated. The processor 202 may direct the operations of the cryptographic circuitry 204 to encrypt and/or decrypt files. In some embodiments, at least a portion of the cryptographic circuitry 204 may be incorporated in or provided by the processor 202. The encryption circuitry 204 may apply any of a variety of cryptographic algorithms to encrypt and decrypt files. For example, the encryption circuitry 204 may apply an AES-256 algorithm to encrypt files transferred to the Internet storage system 106 and decrypt encrypted files 108 retrieved from the Internet storage system 106.

The memory 206 is a non-transitory, computer-readable storage: medium configured to store program instructions and/or data accessible by processor 202. The memory 206 may be implemented using any suitable memory technology, such as static random access memory (SRAM), synchronous dynamic RAM (SDRAM), nonvolatile/Flash-type memory, or any other type of memory, Program instructions and data for implementing the functionality disclosed herein are stored within the memory 206. The memory 206 includes instructions of a private file system manager 208 and a network manager 216, and data including private file system metadata 210, device key 212, and user key 214. The memory 206 may also include other instruction modules and/or data to implement various operations and functions of the network device 102.

The network manager 216 includes instructions that are executed by the processor 202 to access and/or control transfer of data to, from, and between the network transceivers 218 and 220. For example, the network manager 216 may include instructions to configure the network transceiver 218, and manage access to and transfer of data to/from the network device 102 via the local network 112, route data on the local network 112, etc. Similarly, the network manager 216 may include instructions to configure the network transceiver 220, and manage access to and transfer of data to/from the network device 102 via the Internet 114.

The private file system manager 208 includes instructions that are executed by the processor 202 to provide a private file system accessible to the local network 112. That is, the processor 202 executes the instruction of the private file system manager 208 to provide the functionality of the private file system manager 104 of FIG. 1, and any description herein of the private file system manager 208, or any other software module disclosed herein, performing an operation or providing a function refers to the processor 202 executing the instructions of the software module to perform the stated operation or function.

The device key 212 includes hardware specific data that is unique to the network device 102, and the user key 214 includes a password value received from a computing device 110 via the local network 112 or other communication interface provided by the network device 102. The private file system manager 208 combines the device key 212 and the user key 214 to produce an encryption key that the private file system manager 208 applies to encrypt files transmitted to the Internet storage system 106 and decrypt files retrieved from the Internet storage system 106. For example, the private file system manager 208 may concatenate the device key 212 and the user key 214 and hash the combined value to generate an encryption key. Some embodiments, of the private file system manager 208 may combine the device key 212 and the user key 214 in a different way to produce an encryption key. In some embodiments, the device key 212 may be accessible only by the cryptographic circuitry 204. Because the device key 212 is unique to the network device 102, the files encrypted using an encryption key generated from the device key 212 are accessible as plaintext only via the network device 102, For example, a computing device 110 (e.g., a smart phone) on the local network 112 may access the encrypted files 108 because the network device 102 can present the encrypted files as plaintext files. However, if the computing device 110 is not connected to the local network 112 (e.g., the computing device is moved out of range of the local network 112), then the computing device 112 will be unable to access the encrypted files 108 via any network. Accordingly, for mobile devices that connect to and disconnect from the local network 112 with proximity to the network device 102, access to the encrypted files 108 may be seamlessly provided while the mobile device is connected to the local network 112, but access is lost when the mobile device loses connection to the local network 112. Thus, the network device 102 serves as a portal that provides exclusive access to the encrypted files 108.

The private file system metadata 210 includes parameters of the plaintext files transferred to the network device 102 for storage, and/or parameters of the corresponding encrypted files stored in the Internet storage system 106. The private file system metadata 210 may include for a file: a filename, a file size, a storage time value, a storage path, and other parameters needed to identify the plaintext file and/or the encrypted file, and manage the virtual private file system. In some embodiments, the private file system metadata 210 may be stored in the Internet storage system 106 as an encrypted file 108 or a plaintext file 116.

When the network device 102 receives a plaintext file from a computing device 110, the network device 102 activates the cryptographic circuitry 204 to encrypt the file. For example, the private file system manager 208 may store the plaintext file in the memory 206 and notify the cryptographic circuitry 204 of the location and size of the plaintext file. Given the size and location of the plaintext file, the cryptographic circuitry 204 may apply the encryption key derived from device key 212 and user key 214 to encrypt the plaintext file. The encrypted file generated by the cryptographic circuitry 204 may overwrite the plaintext file in the memory 206, or may be stored in the memory 206 as a file separate from the plaintext file. The private file system manager 208 transmits the encrypted file generated by the cryptographic circuitry 204 to the Internet storage system 106 for storage.

To enhance file security, the network device 102 may not retain a copy of the plaintext file received for storage. Accordingly, after the cryptographic circuitry 204 has generated an encrypted version of the plaintext file, if the plaintext file is stored in the memory 206, then the private file system manager 208 may erase or delete the plaintext file (e.g., by overwriting the plaintext file). The private file system manager 208 may store various parameters of the plaintext/encrypted file in the private file system metadata 210 as a list (or other structure) identifying files stored in the Internet storage system 106, and/or defining the structure of the private file system (e.g., the folders and paths of the files).

When the network device 102 receives a request, from a computing device 110, to access a plaintext file that the private file system manager 208 has stored as an encrypted file 108 in the Internet file system 106, the private file system manager 208 communicates with the Internet storage system 106 and retrieves the encrypted file 108 corresponding to the requested plaintext file from the Internet storage system 106. The private file system manager 208 may store the encrypted file in the memory 206 and notify the cryptographic circuitry 204 of the location and size of the encrypted file. Given the size and location of the encrypted file, the cryptographic circuitry 204 may apply the encryption key derived from device key 212 and user key 214 to decrypt the encrypted file. The plaintext file generated by the cryptographic circuitry 204 may overwrite the encrypted file in the memory 206, or may be stored in the memory 206 as a file separate from the encrypted file. The private file system manager 208 transmits the plaintext file to the Internet storage system 106 for storage.

To enhance file security, the network device 102 may not retain a copy of the plaintext file. Accordingly, after the cryptographic circuitry 204 has regenerated the plaintext file the private file system manager 208 may erase or delete the plaintext file (e.g., by overwriting the plaintext file). Similarly, the private file system manager 208 may erase or delete the encrypted file, if the encrypted file remains in the storage 206 after decryption.

Some embodiments of the private file system manager 208 may be implemented using Filesystem in Userspace (FUSE). The private file system manager 208 may implement a variety of functions generally included in file systems, such as: init( ), destroy( ), getattr( ), access( ), opendir ( ), readdir( ), mkdir( ), unlink( ), rmdir( ), rename( ), chmod ( ), chown( ), open( ), read( ), write( ), releasedir( ), etc.

Figure 3:
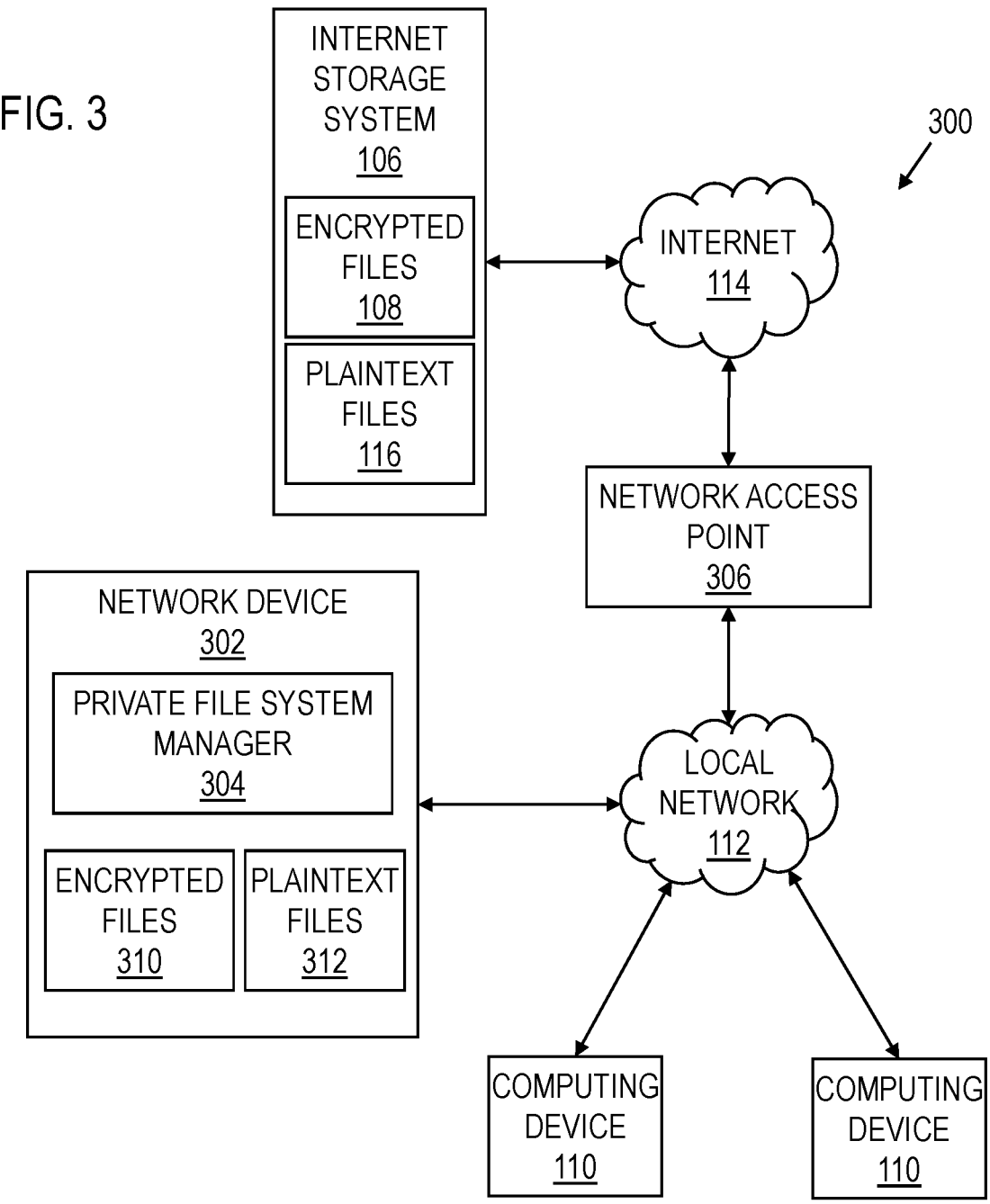
FIG. 3 shows a block diagram for a system for providing a virtual private file system in accordance with various embodiments.

FIG. 3 shows block diagram for a system 300 for providing a virtual private file system in accordance with various embodiments. The system 300 includes a network device 302. The network device is coupled to a local network 112. One or more computing devices 110 are also coupled to the local network 112. The computing devices 110 communicate with the network device 302 via the local network 112. The local network may include a wireless local area network and/or a wired local area network. For example, the local area network may include a wireless local area network compliant with an IEEE 802.11 standard, and/or a wired local area network compliant with an IEEE 802.3 standard, and/or a different type of wired or wireless network whether proprietary or standard compliant.

The computing device 110 may be any device that is capable of communicating with the network device 302 via the local network 112. For example, the computing device 110 may be a desktop computer, a laptop computer, a tablet computer, a smartphone, a smart television, a media player, or any other computer-based device that can communicate with the network device 302 via the local network 112.

The network device 302 may provide any of a variety of functionalities to be utilized by the computing devices 110. For example, the network device 102 may include circuitry and logic to operate as a network attached storage device, to operate as a media server, etc. In some embodiments, the network device 302 may include storage to store files on the local network 112, and may communicate with the Internet storage system 106 to store files remotely.

The network device 302 may be connected to the Internet 114 via the network access point 306 and a cable modem or other device suitable to communicatively couple the local network 112 to the Internet 114. In some embodiments, the network device 302 may include the network access point 306 and/or other components configured to couple the local network 112 to the Internet 114. For example, the network access point 306 may include, or be connected to a cable modem, a satellite data interface, a digital subscriber line interface, a power line network interface, a terrestrial wireless broadband wireless network interface, an optical fiber network interface, or an interface to another network that provides access to the Internet 114. In the system 300, the network access point 306 may provide access to the Internet 114 via any of a wide variety of Internet connection technologies internal or external to the network access point 306. For example, the network access point 306 may include an IEEE 802.3 compliant interface and be coupled to an external cable modem via the IEEE 802.3 compliant interface.

The network device 302 includes a private file system manager 304. The private file system manager 304 may be an embodiment of the private file system manager 104. The private file system manager 304 creates and manages a private file system that is accessible to the computing devices 110 connected to the local network 112. The network device 302 may provide storage (internal or connected to the local network 112) for files managed by the private file system manager 304. The private file system manager 304 may also utilize an Internet storage service to provide storage for the files managed by the private file system manager 304. Accordingly, the private file system manager 304 is coupled to an Internet storage system 106 via the Internet 114. The Internet storage system 106 provides storage for at least some of the files managed by the private file system manager 304. The Internet storage system 106 may be distant from the network device 302 and store data received from any number of different entities. The structure of the storage applied by the Internet storage system 106 to store files may be obscured from the network device 302.

Some of the files managed by the private file system manager 304 are secured by encryption. Accordingly, private files stored in the Internet storage system 106 are transmitted to the Internet storage system 106 and stored as encrypted files 108. Thus, the files managed by the private file system manager 304 are present on the Internet 114 and the Internet storage system 106 only in encrypted form. Similarly, private files stored in a local storage device by the network device 302 as encrypted files 310 are encrypted prior to storage. Plaintext versions of the files managed by the private file system manager 304 may be stored locally as plaintext files 312 or may be transmitted via the Internet 114 and stored in the Internet storage system 106 as plaintext files 116. The files managed by the private file system manager 304 appear to the computing devices 110 connected to the local network 112 as though stored in the local network 112, e.g., by the network device 302 in plaintext form. In some embodiments, the private file system manager 304 presents a unified file system that includes the encrypted files 108, 310 and the plaintext files 116, 312 to the computing devices 110, where, for example, encrypted files 108, 310 and the plaintext files 116, 312 may be branches of the same file system.

When a computing device 110 transmits a plaintext file to the network device 302 for storage in the Internet storage system 106 as an encrypted file 108, the network device 302 encrypts the file, and transmits the encrypted file to the Internet storage system 106 for storage. The network device 302 may delete or erase the plaintext file from the network device 302. That is, after the network device 302 encrypts the plaintext file received from the computing device 110, the network device 302 may ensure that the plaintext file is not stored in the network device 302. The network device 302 may store metadata for the file. For example, the network device 302 may store a list of the files parameters (e.g., file names, sizes, file owners, access permissions, last access time, last modification time, etc.) of the encrypted files 108 for presentation to the computing devices 110 as the private secure file system maintained by the private file system manager 304.

When a computing device 110 requests access to a plaintext file that the private file system manager 304 has stored as an encrypted file 108, the private file system manager 304 communicates with the Internet storage system 106 and retrieves the encrypted file 108 corresponding to the requested plaintext file from the Internet storage system 106. The private file system manager 304 decrypts the encrypted file 108 retrieved from the Internet storage system 106 to produce the requested plaintext file, and transmits the plaintext file to the computing device 110 that requested access to the file. The private file system manager 304 may erase the recreated plaintext file from the network device 302 after transmission of the plaintext file to the requesting computing device 110.

The private file system manager 304 may apply any of a variety of encryption algorithms to secure the files stored in the Internet storage system 106. For example, the private file system manager 304 may apply AES-256 or any other suitable encryption technique. The private file system manager 304 may generate an encryption key to apply to encrypt the plaintext files received from the computing devices 110 and/or to decrypt the encrypted files 108 retrieved from the Internet storage system 106. The private file system manager 304 may generate the encryption key as a combination of data unique to the network device 302 and data received from one of the computing devices 110. For example, the network device 302 may receive a password value (e.g., a file system password value) from one of the computing devices 110 (e.g., a user of one of the computing devices 110 may provide a password value for the private file system). The private file system manager 304 may combine the password value with a data value unique to the network device 302 to produce an encryption key. The data value unique to the network device 302 may be unique across all network devices 302 or unique to a particular type or model of the network device 302. In embodiments of the network device 302 in which the data value unique to the network device 302 is unique to a particular type or model of the network device 302, embodiments advantageously allow the encryption key to be recreated using a different instance of the network device 302 in situations where an instance of the network device 302 used to generate the encrypted files 108 fails or is otherwise unavailable. In some embodiments, the private file system manager 304 combines the password and the data value unique to the network device 302 by applying a hash to the concatenated password and data value unique to the network device 302. Some embodiments of the private file system manager 304 may generate an encryption key by combining the password and the data value unique to the network device 302 in a different manner.

Figure 4:
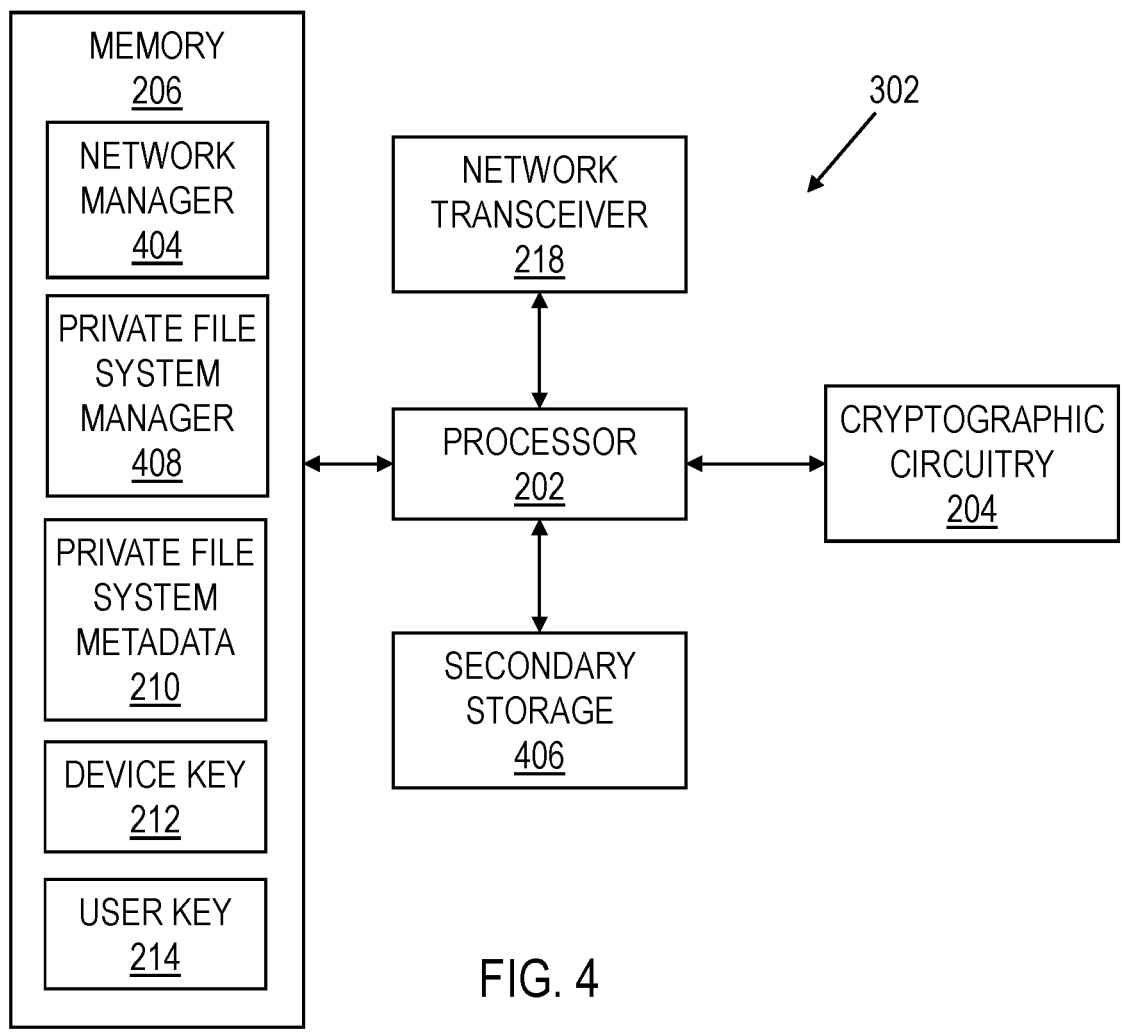
FIG. 4 shows a block diagram for a network device for providing a virtual private file system in accordance with various embodiments.

FIG. 4 shows a block diagram for the network device 302 in accordance with various embodiments. The network device 302 includes a processor 202, cryptographic circuitry 204, a network transceiver 218, memory 206, and secondary storage 406. The processor 202 is an instruction execution circuit, and in various embodiments, may include one or more genera purpose or embedded microprocessors, microcontrollers, network processors, digital signal processors, and/or other instruction execution machines. The processor 202 is coupled to the cryptographic circuitry 204, the network transceiver 218, the memory 206, and the secondary storage 406.

The network transceiver 218 may include circuitry to interface the network device 302 to the local network 112. For example, the network transceiver 218 may include circuitry to interface to one or more antennas of the network device 302 if the local network 112 is a wireless network. Similarly, the network transceiver 218 may include line driver and line receiver circuitry if the local network 112 is a wired network. The network transceiver 218 may also include a modulator, a demodulator, an encoder, a decoder, amplifiers, filters, and/or other components. For example, the network transceiver 218 may implement an IEEE 802.11 compliant network interface or an IEEE 802.3 compliant network interface.

The cryptographic circuitry 204 includes circuits and/or logic to encrypt plaintext files, i.e., generate an encrypted file from a plaintext file, and to decrypt encrypted files, i.e., recreate the plaintext file from which the encrypted file was generated. The processor 202 may direct the operations of the cryptographic circuitry 204 to encrypt and/or decrypt files. In some embodiments, at least a portion of the cryptographic circuitry 204 may be incorporated in or provided by the processor 202. The encryption circuitry 204 may apply any of a variety of cryptographic algorithms to encrypt and decrypt files. For example, the encryption circuitry 204 may apply an AES-256 algorithm to encrypt files transferred to the Internet storage system 106 and decrypt files retrieved from the Internet storage system 106.

The memory 206 is a non-transitory, computer-readable storage medium configured to store program instructions and/or data accessible by processor 202. The memory 206 may be implemented using any suitable memory technology, such as static random access memory (SRAM), synchronous dynamic RAM (SDRAM), nonvolatile/Flash-type memory, or any other type of memory. Program instructions and data for implementing the functionality disclosed herein are stored within the memory 206. The memory 206 includes instructions of a private file system manager 408, and a network manager 404, and data including private file system metadata 210, device key 212, and user key 214. The memory 206 may also include other instruction modules and/or data to implement various operations and functions of embodiments of the network device 302.

The network manager 404 includes instructions that are executed by the processor 202 to access and/or control transfer of data to and/or from the network transceiver 218. For example, the network manager 404 may include instructions to configure the network transceiver 218, and manage access to and transfer of data to/from the network device 302 via the local network 112.

The local private system manager 408 includes instructions that are executed by the processor 202 to provide a local tile system accessible to the computing devices 110 connected to the local network 112. The files of the local file system may be stored in secondary storage 406. The secondary storage 408 may include various types of computer-readable media accessible by the processor 202. The secondary storage 406 may include storage media or memory media such as semiconductor storage, magnetic or optical media, e.g., disk or other storage technologies. The files may be stored in the secondary storage 406 as plaintext files 312 or encrypted files 310.

The private file system manager 408 also includes instructions that are executed by the processor 202 to store and retrieve files from the Internet storage system 106 as part of a file system accessible to the local network 112. The private file system manager 408 may be an embodiment of the private file system manager 208 of FIG. 2. In some embodiments of the network device 302, the private file system manager 408 presents a unitary file system to the computing devices 110. The unitary file system may include files stored in secondary storage 406 and files stored in the Internet storage system 106.

The device key 212 includes data unique to the network device 302, and the user key 214 includes a password value received from a computing device 110. The private file system manager 408 combines the device key 212 and the user key 214 to produce an encryption key that the private file system manager 408 applies to encrypt files transmitted to the Internet storage system 106 and decrypt files retrieved from the Internet storage system 106. For example, the private file system manager 408 may concatenate the device key 212 and the user key 214 and hash the combined value. Some embodiments of the private file system manager 408 may combine the device key 212 and the user key 214 in a different way to produce an encryption key.

The private file system metadata 210 includes parameters of the plaintext files transferred to the network device 302 for secure storage, and/or parameters of the corresponding encrypted files stored in the Internet storage system 106. The private file system metadata 210 may include for a file: a filename, a file size, a storage time value, and other parameters for identifying the plaintext file and/or the encrypted file and the location of the file in the private file system.

When the network device 102 receives a plaintext file from a computing device 110, the network device 102 activates the cryptographic circuitry 204 to encrypt the file. For example, the private file system manager 408 may store the plaintext file in the memory 206 and notify the cryptographic circuitry 204 of the location and size of the plaintext file. Given the size and location of the plaintext file, the cryptographic circuitry 204 may apply the encryption key derived from device key 212 and user key 214 to encrypt the plaintext file. The encrypted file generated by the cryptographic circuitry 204 may overwrite the plaintext file in the memory 206, or may be stored in the memory 206 as a file separate from the plaintext file. The private file system manager 408 transmits the encrypted file to the Internet storage system 106 for storage.

To enhance file security, the network device 302 may not retain a copy of the plaintext file. Accordingly, after the cryptographic circuitry 204 has generated an encrypted version of the plaintext file, if the plaintext file is stored in the memory 206, then the private file system manager 408 may erase or delete the plaintext file (e.g., by overwriting the plaintext file). The private file system manager 408 may store various parameters of the plaintext/encrypted file in the private file system metadata 210 as a list (or other structure) identifying files stored in the Internet storage system 106.

When the network device 302 receives a request, from a computing device 110, to access a plaintext file that the private file system manager 408 has stored as an encrypted file 108 in the Internet file system 106, the private file system manager 408 communicates with the Internet storage system 106 and retrieves the encrypted file 108 corresponding to the requested plaintext file from the Internet storage system 106. The private file system manager 408 may store the encrypted file in the memory 206 and notify the cryptographic circuitry 204 of the location and size of the encrypted file. Given the size and location of the encrypted file, the cryptographic circuitry 204 may apply the encryption key derived from device key 212 and user key 214 to decrypt the encrypted file. The plaintext file recreated by the cryptographic circuitry 204 may overwrite the encrypted file in the memory 206, or may be stored in the memory 206 as a file separate from the encrypted file. The private file system manager 408 transmits the plaintext file to the Internet storage system 106 for storage.

To enhance file security, the network device 302 may not retain a copy of the plaintext file. Accordingly, after the cryptographic circuitry 204 has regenerated the plaintext file, and the plaintext file has been transmitted to the computing device 110 that requested the file, the private file system manager 408 may erase or delete the plaintext file (e.g., by overwriting the plaintext file). Similarly, the private file system manager 408 may erase or delete the encrypted file, if the encrypted file remains in the memory 206 after decryption.

Figure 5:
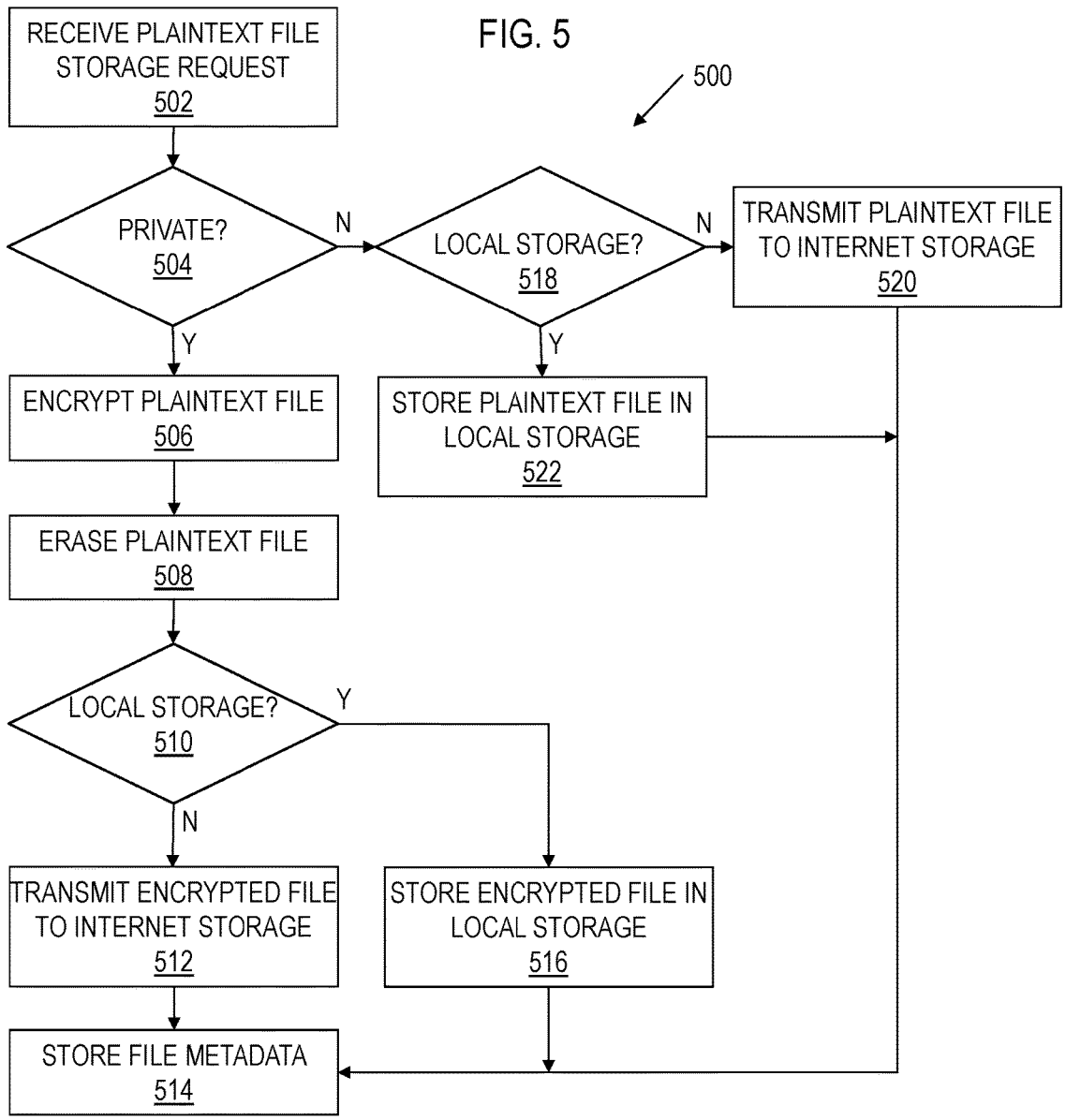
FIG. 5 shows a flow diagram for a method for storing a file in a virtual private file system in accordance with various embodiments.

FIG. 5 shows a flow diagram for a method 500 for storing a file in a virtual private file system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500 may be provided by instructions executed by the processor 202 of the network device 102 or 302. Operations of the method 500 are described with respect to the network device 302, and are equally applicable to the network device 102. For example, the network device 102 may be an embodiment of the network device 302 that includes access point logic and local secondary storage.

In block 502, the network device 302 has been initialized and is ready to communicate with the computing devices 110 via the local network 112. The network device 302 receives a plaintext file from one of the computing devices 110 via the local network 112, and receives in conjunction with the plaintext file a request to store the plaintext file.

In block 504, the network device 302 determines whether the file received in block 502 is to be stored as a private file. For example, a pathname or other metadata provided with the storage request may specify whether the file is encrypted or stored as plaintext.

If in block 504, the network device 302 determines that that file received in block 502 is to be stored as a private file, then in block 506, private file system manager 304 encrypts the received plaintext file to produce an encrypted file (i.e., a ciphertext file). Encrypting the plaintext file may include directing the cryptographic circuitry 204 to apply an encryption key generated by the network device 302 to encrypt the file.

In block 508, the private file system manager 304 erases the plaintext file received in block 502 and any copies of the plaintext file received in the block 502 stored in the network device 302.

In block 510, the private file system manager 304 determines whether the encrypted file is to be stored locally or in the Internet storage system 106. For example, a pathname or other metadata provided with the storage request may specify whether the storage destination is local storage or the Internet storage system 106.

If, in block 510, the private file system manager 304 determines that the encrypted file is to be stored in the Internet storage system 106, then, in block 512, the private file system manager 304 transmits the encrypted file produced in block 506 to the Internet storage system 106 for storage as encrypted file 108. Thus, the plaintext file received in block 502 is never exposed to the Internet. On the other hand, if the private file system manager 304 determines that the encrypted file is to be stored in local storage, then, in block 516, the private file system manager 304 stores the encrypted file produced in block 506 in the secondary storage 406 as encrypted file 310.

In block 512, the private file system manager 304 stores metadata for the file received in block 502. For example, the private file system manager 304 may store the filename, storage location, pathname, size, storage time, and other attributes and parameters of the file in local storage, such as memory 206, secondary storage 406, or the Internet storage system 106. The private file system manager 304 may provide the metadata to the computing device 110 as a list or other structure detailing the files stored in, and the structure of, the private file system managed by the private file system manager 304.

If, in block 504, the network device 302 determines that that file received in block 502 is not to be stored as a private file, then in block 518, the network device 302 determines whether plaintext file is to be stored in local storage or in the Internet storage system 106. If the file is to be stored locally, then in block 522, the private file system manager 304 stores the file in the secondary storage 406 as plaintext file 312. If the file is to be stored in the Internet storage system 106, then in block 520, the private file system manager 304 transmits the plaintext file to the Internet storage system 106 as the plaintext file 116.

In block 518, the local file system manager 308 stores, in the secondary storage 406 or memory 206, metadata for the plaintext file stored by the local file system manager 308. The local file system manager 308 may provide the metadata to the computing device 110 as a list or other structure detailing the files stored in, and the structure of, the local file system managed by the local file system manager 308.

Figure 6:
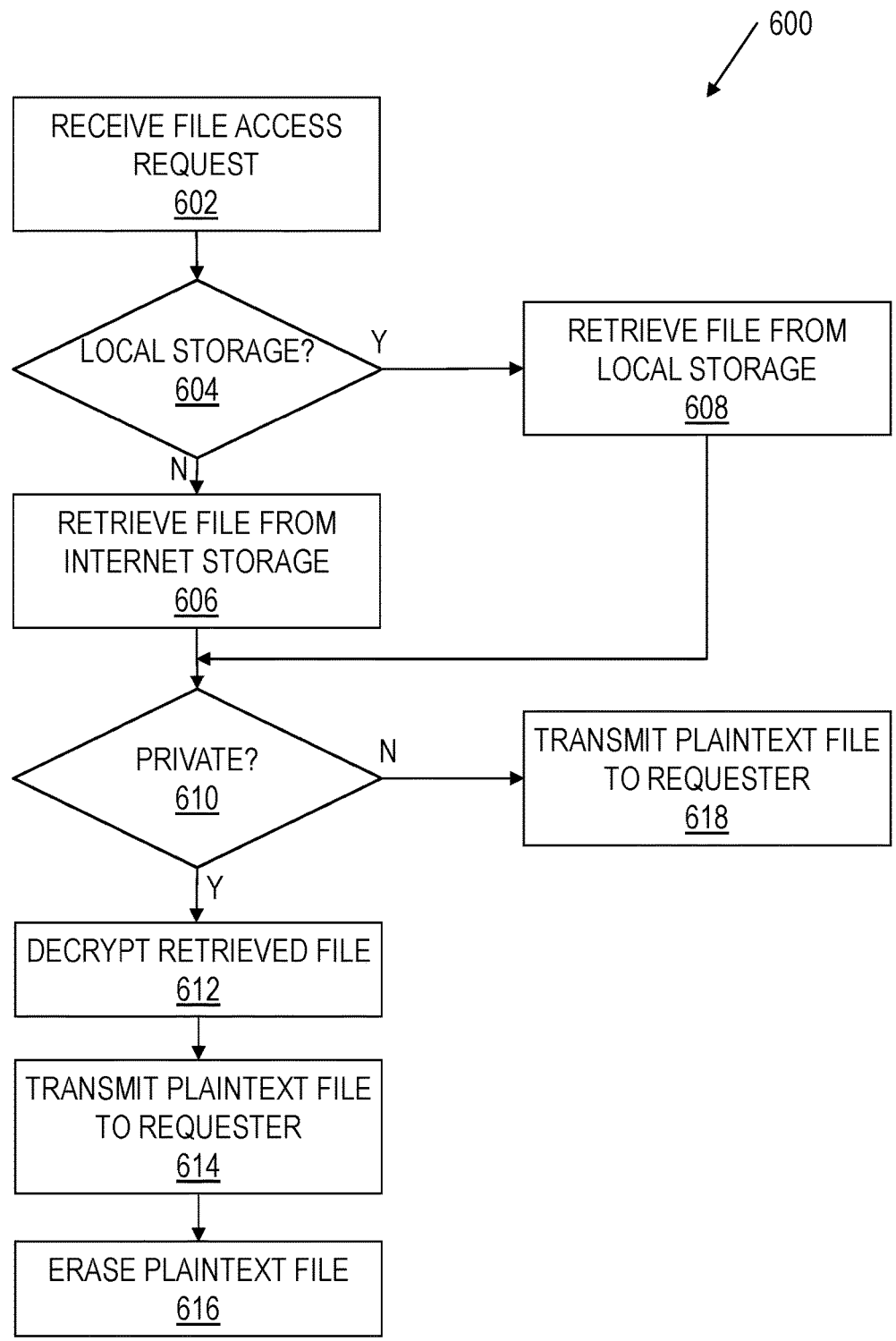
FIG. 6 shows a flow diagram for a method for accessing a file in a virtual private file system in accordance with various embodiments.

FIG. 6 shows a flow diagram for a method 600 for accessing a file in a virtual private file system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be provided by instructions executed by the processor 202 of the network device 102 or 302. Operations of the method 600 are described with respect to the network device 302, and are equally applicable to the network device 102. For example, the network device 102 may be an embodiment of the network device 302 that includes access point logic and local secondary storage.

In block 602, the network device 302 receives a request from one of the computing devices 110 to access a file managed by the private file system manager 304 of the network device 302. For example, the file to which access is requested may be stored in the Internet storage system 106 or in local storage managed by the network device 302.

In block 604, the network device 302 determines whether the file to which access is requested is stored in local storage or in the Internet storage system 106. For example, a pathname or other information provided with the file access request may indicate whether the file is stored in local storage on in the Internet storage system 106. In some embodiments, the network device 302 may compare information provided with the file access request to metadata 210 or other stored metadata for files managed by the network device 302 to determine whether the file is stored in a private file system or a local file system.

If in block 604, the network device 302 determines that the file to which access is requested is stored in local storage, then in block 608, the private file system manager 304 retrieves the file from secondary storage 406. If in block 604, the network device 302 determines that the file to which access is requested is stored in the Internet storage system 106, then in block 604, the private file system manager 304 formulates a request to retrieve the file from the Internet storage system 106 and transmits the request to the Internet storage system 106. For example, the private file system manager 304 may request the file based on the file pathname, the encrypted file pathname, or other identification applied to the file when stored in the Internet storage system 106. The Internet storage system 106 reads the file 108 from storage and returns the file 108 to the private file system manager 304.

In block 610, the private file system manager 304 determines whether the requested file is a plaintext file or an encrypted file. For example, a pathname or other information provided with the file access request may indicate whether the file is plaintext or encrypted. If the private file system manager 304 determines that the file is a plaintext file, then, in block 618, the private file system manager 304 transmits the plaintext file to the requester.

If, in block 610, the private file system manager 304 determines that the file is encrypted, then, in block 612, the private file system manager 304 triggers the cryptographic circuitry 204 to decrypt the encrypted file, thereby recreating the original plaintext file.

In block 614, the network device 302 transmits the recreated plaintext file to the computing device 110 that requested the file via the local network 112.

In block 616, the private file system manager 304 erases the recreated plaintext file from the network device 302.

Figure 7:
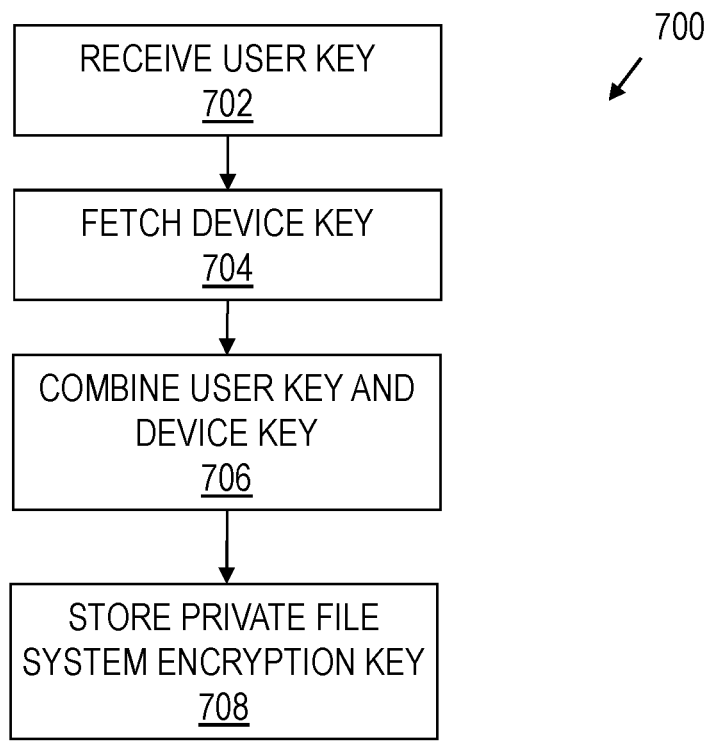
FIG. 7 shows a flow diagram for constructing an encryption key for use in securing files of a virtual private file system in accordance with various embodiments.

FIG. 7 shows a flow diagram for a method 700 for constructing an encryption key for use in securing files of a virtual private file system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 700 may be provided by instructions executed by the processor 202 of the network devices 102 or 302. Operations of the method 700 are described with respect to the network device 302, and are equally applicable to the network device 102.

In block 702, the network device 302 is initializing a private file system. As part of the initialization, the private file system manager 304 receives a user key value. The user key value may be a password or other security information that a user of the network device 302 or one of the computing devices 110 provides to secure the private file system. The user key value may be transmitted to the network device 302 by one of the computing device 110 via the local network 112, or may be provided to the network device 302 via an input device, such as a keyboard, via a universal serial interface, a personal area network interface, etc.

In block 704, the network device 302 retrieves a device key value. The device key value may be a data value that is uniquely associated with the network device 302 and stored in the network device 302 at manufacture. In some embodiments, each instance of the network device 302 may include a different device key value. For example, a device key value be a device serial number or derived from a device serial number. In some embodiments, each type, model, or other identifiable set of network devices 302 may include a same device key value. Such embodiments may facilitate recreation of an encryption key if the network device 302 that created a private file system is unavailable. In some embodiments, the device key value may accessible only via the cryptographic circuitry 204 for increased security.

In block 706, the private file system manager 304 combines the user key value and the device key value to create an encryption key for use in encrypting and/or decrypting the files managed by the private file system manager 304. For example, the private file system manager 304 may concatenate the user key value and the device key value and apply a hash to the concatenated value to create the encryption key. Various embodiments of the private file system manager 304 may apply an SHA-256 hash or other hash function. Some embodiments of the private file system manager 304 may generate an encryption key by combining the user key value and the device key value in a different way.

In block 708, the private file system manager 304 stores the encryption key created in block 706. The encryption key may be stored in the memory 206, the secondary storage 406, or other storage resource of the network device 302. The private file system manager 304 or the cryptographic circuitry 204 may retrieve the encryption key from storage for use in encrypting and/or decrypting files of a private file system.

Some embodiments of the network device 102, 302 may employ multiple encryption keys to secure the encrypted files 108. For example a data encryption key may be applied to encrypt the data of the files 108, an inode encryption key may be used to encrypt various metadata, headers, and/or footers of the files 108, and a password encryption key may be used to encrypt some file system metadata. The data encryption key ($K_D$) may remain constant over time, and be computed as:

$$K_D = SHA3(R) \oplus K_{PF}$$

where:
$K_{PF}$ is a hash of a user provided first password value (i.e., the user key 214); and
R is a random value.
R may be encrypted with $K_{PF}$ and the encrypted value stored in the file system metadata.
The inode key ($K_i$) may be computed as:

$$K_i = SHA3^n(K_P) \oplus SHA3^n(K_E)$$

where:
$K_P$ is a hash of a user provided second password value;
$K_E$ is a hash of a value that is unique to the network device hardware (i.e., the device key 212); and
n is periodically changed (e.g., periodically incremented).
n may be encrypted with $K_P$ and the encrypted value stored in the file system metadata.

As explained above, a network device employing multiple encryption keys may rely on entry of multiple security values (multiple passwords) by a user. Accordingly, to enable access to the encrypted files 108 by a different network device, the user must provide the multiple passwords to the new network device, and the new network device must include the same hardware based unique value that was used, in conjunction with the multiple passwords, to compute the encryption keys applied to the encrypted files 108.

Figure 8:
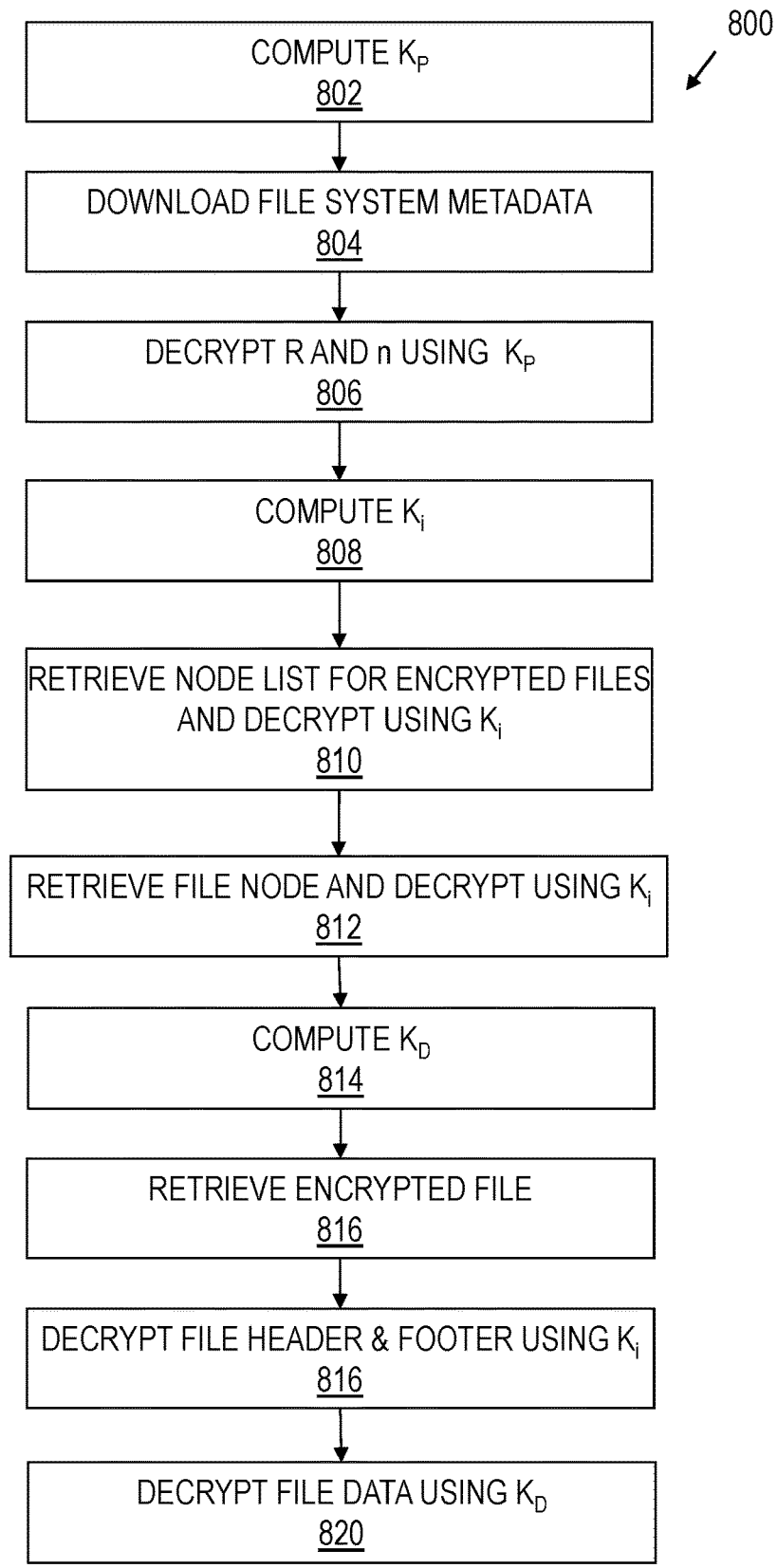
FIG. 8 shows a flow diagram for a method for accessing a file in a virtual private file system that employs multiple encryption keys in accordance with various embodiments.

FIG. 8 shows a flow diagram for a method 800 for accessing a file in a network device 102 that employs multiple encryption keys in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 800 may be provided by instructions executed by the processor 202 of the network devices 102 or 302. Operations of the method 800 are described with respect to the network device 302, and are equally applicable to the network device 102.

In block 802, the network device 302 has received a request to access an encrypted file 108. The private file system manager 304 computes $K_P$ by applying a hash (e.g., SHA3) to a password value received from a user of the network device.

In block 804, the private file system manager 304 accesses the encrypted files 108 and downloads file system metadata. The file system metadata may be encrypted using one or more encryption keys.

In block 806, the private file system manager 304 extracts values of R and n from the file system metadata and decrypts the values of R and n using $K_P$.

In block 808, the private file system manager 304 uses the decrypted value of n to compute $K_i$ by combining hashed values of $K_P$ and $K_E$.

In block 810, the private file system manager 304 retrieves the node list for the encrypted files 108, and decrypts the node list using $K_i$.

In block 812, the private file system manager 304 parses the node list to identify the file node for the requested file, retrieves the file node for the requested file, and decrypts the file node using $K_i$.

In block 814, the private file system manager 304 computes $K_D$ by combining a hash of R, as decrypted in block 806, and a hashed user provided password value ($K_{PF}$).

In block 816, the private file system manager 304 retrieves the encrypted file 108.

In block 818, the private file system manager 304 decrypts the header and footer of the encrypted file 108 using $K_i$. The length of the header and footer may be extracted from the file metadata and decrypted using $K_i$.

In block 820, the private file system manager 304 decrypts the data of the encrypted file 108 using $K_D$.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

Certain terms are used throughout the foregoing description and the following claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be based on Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A network router, comprising:
cryptographic circuitry;
a first transceiver configured to provide communication via a local area network;
a second transceiver configured to provide communication via a wide area network;
a processor coupled to the cryptographic circuitry, the first transceiver, and the second transceiver, wherein the processor is configured to:
receive, via the local area network, a first plaintext file;
determine that the first plaintext file is to be stored in a cloud storage system accessible via the wide area network;
generate an encryption key based on a hardware specific value recorded in the network router;
encrypt the first plaintext file using the cryptographic circuitry and the encryption key to create an encrypted file;
send the encrypted file to the cloud storage system via the wide area network;
receive, via the local area network, a second plaintext file;
determine that the second plaintext file is to be stored locally;
store the second plaintext file in unencrypted form locally in a data store coupled to the network router;
maintain a list of files, the list including encrypted files stored on the cloud storage system and unencrypted files stored locally in the data store coupled to the network router; and
present the list of files to a computing device coupled to the local area network as a file system resident on the local area network.

2. The network router of claim 1, wherein the processor is further configured to:
receive from the computing device a request to access the first plaintext file;
retrieve the encrypted file from the cloud storage system;
decrypt the encrypted file using the cryptographic circuitry to recreate the first plaintext file; and
send the first plaintext file to the computing device.

3. The network router of claim 1, wherein generating the encryption key comprises:
receiving, via the local area network, user specified security information; and
combining the user specified security information with the hardware specific value to create the encryption key.

4. The network router of claim 1, wherein determining that the first plaintext file is to be stored in the cloud storage system comprises examining a pathname for the first plaintext file, and wherein determining that the second plaintext file is to be store locally comprises examining a pathname for the second plaintext file.

5. A method, comprising:
receiving, by a network device coupled to a local computer communication network, a first plaintext file;
generating, by the network device, an encryption key based on a hardware specific value recorded in the network device;
responsive to determining that the first plaintext file is to be stored as ciphertext:
encrypting, by the network device, the first plaintext file with the encryption key to produce an encrypted file; and
transmitting, by the network device, the encrypted file to an Internet storage system;
receiving, by the network device, a second plaintext file;
responsive to determining that the second plaintext file is to be stored as plaintext, storing the second plaintext file in a local storage system;
maintaining, by the network device, a list of files, the list including a reference to the encrypted file stored on the Internet storage system and the second plaintext file stored in the local storage system; and
presenting, to a computing device coupled to the local computer communication network, the list of files as a file system resident on the local computer communication network.

6. The method of claim 5, further comprising determining that the first plaintext file is to be stored as ciphertext based on metadata for the first plaintext file.

7. The method of claim 5, further comprising:
receiving, by the network device, from the computing device, a request to access the first plaintext file;
retrieving, by the network device, the encrypted file from the Internet storage system;
decrypting, by the network device, the encrypted file to recreate the first plaintext file; and
transmitting, by the network device, the first plaintext file to the computing device.

8. The method of claim 5, further comprising:
receiving, by the network device, user specified security information; and
generating, by the network device, the encryption key using the user specified security information and the hardware specific value of the network device.

9. The method of claim 8, wherein generating the encryption key comprises applying, by the network device, a hash to the user specified security information and to the hardware specific value.

10. The method of claim 5, further comprising:
storing, by the network device, metadata for the first plaintext file; and
comparing, by the network device, the metadata to a file identification provided to the network device in a request to access the first plaintext file to determine that the encrypted file is to be retrieved from the Internet storage system.

11. The method of claim 5, further comprising configuring a different network device to access the encrypted file stored in the Internet storage system by:
providing the different network device with a hardware specific value provided to the network device;
providing the different network device with user specified security information provided to the network device; and
generating, by the different network device, the encryption key using the user specified security information and the hardware specific value.

12. The method of claim 11, wherein providing the different network device with the hardware specific value comprises using the different network device to retrieve the hardware specific value from a database.

13. A network device, comprising:
a processor; and
a network interface coupled to the processor and configured to couple the network device to a computer communication network;
wherein the processor is configured to:
generate an encryption key based on a hardware specific value recorded in the network device;

determine whether a first plaintext file received for storage is to be stored as plaintext or ciphertext;

responsive to a determination that the first plaintext file is to be stored as ciphertext, encrypt the first plaintext file using the encryption key and send the encrypted file to an Internet storage system;

determine whether a second plaintext file received for storage is to be stored as plaintext or ciphertext;

responsive to a determination that the second plaintext file is to be stored as plaintext, store the second plaintext file in a local storage system;

maintain a list of files, the list including a reference to the encrypted file stored on the Internet storage system and the second plaintext file stored in the local storage system; and present the list of files as a file system resident on the local storage system.

14. The network device of claim 13, wherein each of the determinations is based on metadata for the respective plaintext file.

15. The network device of claim 13, further comprising another network interface coupled to the processor, wherein the processor is further configured to:

transmit all files as plaintext via the network interface;

determine, for each file to be transmitted via the other network interface, whether to encrypt the file prior to transmission; and encrypt at least some files prior to transmission via the other network interface.

16. The network device of claim 13, wherein the processor is further configured to:

receive, from the computing device, a request to access the first plaintext file;

retrieve the encrypted file from the Internet storage system;

decrypt the encrypted file to recreate the first plaintext file; and transmit the first plaintext file to the computing device.

17. The network device of claim 13, wherein the processor is further configured to present, to a computing device coupled to the computer communication network, the encrypted file stored in the Internet storage system and the second plaintext file as being stored in a file system in the computer communication network.

18. The network device of claim 13, wherein the processor is further configured to:

store metadata for encrypted files stored in the Internet storage system; and compare the metadata to file identification provided to the processor in a request to access the first plaintext file to identify the encrypted file to be retrieved from the Internet storage system.

19. The network device of claim 13, further comprising a storage device coupled to the processor, wherein the second plaintext file is stored in the storage device coupled to the processor.

20. The network device of claim 13, wherein the network device is a network router, a network switch, a wireless network access point, a digital media server, or a network attached storage device.

* * * * *